United States Patent [19]

Nakano et al.

[11] Patent Number: 5,313,617
[45] Date of Patent: May 17, 1994

[54] MULTI-DISC OPTICAL DATA STORAGE SYSTEM FOR USE WITH A HOST COMPUTER FOR EMULATING A MAGNETIC DISC DEVICE

[75] Inventors: Toshio Nakano; Masafumi Nozawa, both of Odawara, Japan

[73] Assignee: Hitachi, Ltd., Tokyo, Japan

[21] Appl. No.: 669,359

[22] Filed: Mar. 14, 1991

[30] Foreign Application Priority Data

Mar. 19, 1990 [JP] Japan .................. 2-69257

[51] Int. Cl.[5] .............................................. G06F 13/00
[52] U.S. Cl. ..................... 395/500; 395/425; 395/725; 364/DIG. 1; 364/243; 364/245.7; 364/249.4
[58] Field of Search ............... 395/500, 400, 425, 600, 395/725, 800

[56] References Cited

U.S. PATENT DOCUMENTS

| | | | |
|---|---|---|---|
| 4,876,662 | 10/1989 | Pence ................... | 364/900 |
| 4,953,122 | 8/1990 | Williams ............... | 395/400 |
| 4,974,156 | 11/1990 | Harding et al. ....... | 395/425 |
| 4,980,818 | 12/1990 | Shinmura .............. | 395/425 |
| 4,987,533 | 1/1991 | Clark et al. ........... | 395/600 |
| 5,040,110 | 8/1991 | Miki et al. ............ | 395/600 |
| 5,121,492 | 6/1992 | Saville, III et al. .... | 395/500 |
| 5,129,076 | 7/1992 | Freeman et al. ...... | 395/425 |

*Primary Examiner*—Alyssa H. Bowler
*Assistant Examiner*—Mehmet Geckil
*Attorney, Agent, or Firm*—Fay, Sharpe, Beall, Fagan, Minnich & McKee

[57] ABSTRACT

A data storage system comprises a magnetic disk, an optical disk, optical disk drive units, and optical disk transport devices for transporting the optical disk to the optical disk drive units as required. The data storage system further comprises a host system for receiving and transmitting a command and data in the format of the magnetic disk and a converter for converting the command and the data between the format of the magnetic disk and that of the optical disk. The optical disk, the optical disk drive unit and the optical disk transport device are controlled by a command and data in the format of the magnetic disk of the host system.

19 Claims, 6 Drawing Sheets

MULTI-DISC OPTICAL DATA STORAGE SYSTEM FOR USE WITH A HOST COMPUTER FOR EMULATING A MAGNETIC DISC DEVICE

BACKGROUND OF THE INVENTION

The present invention relates to a data storage system comprising a plurality of low-bit-cost memory media such as optical disks stored therein.

Many techniques including the one disclosed in JP-A-53-23199 are known as conventional data storage systems like a library system having a plurality of data media stored therein.

In these data storage systems, a multiplicity of memory media stored therein are transported for access to a memory medium drive unit as required. Generally, however, they are controlled by a host system supporting commands for data processing and a transport system depending on the features of the media and utilizing the data stored in the memory media.

SUMMARY OF THE INVENTION

An object of the present invention is to provide a data storage system using a low-bit-cost memory medium such as an optical disk capable of emulating a magnetic disk unit, or a magnetic disk subsystem in particular.

Another object of the present invention is to improve the reliability and response characteristics of a data storage system using a low-bit-cost memory medium emulating the magnetic disk unit.

An external memory unit most widely used in the field of the mainframe computer is a magnetic disk unit. This is due to the fact that the magnetic disk unit is capable of large capacity storage with high-density recording and random access with high performance, and is high in reliability for a number of past achievements thereof.

The amount of data held by users is ever on the increase, and an increased capacity and a decreased cost of the magnetic disk unit is a matter of great urgency. Various storage devices of large capacity and low price are under development. Of all of them, a rewritable and overwritable (reloadable) optical disk is capable of random access and low in storage cost. However, the reason why these storage devices are not used in a wide range of the fields is due to the fact that the mainframe computer has so far progressed by succeeding to the past properties of software. In other words, the use of a new storage system would require the support of an operating system (OS) and alteration of the conventional file storage method while changing the past software properties into ones adapted for a new storage device.

According to one aspect of the present invention, in order to reduce the burden of introduction of a new system, there is provided a data storage system comprising an interface similar to a magnetic disk. This means that a command developed for the magnetic disk is used for control. The data storage system according to the present invention, therefore, obviates various technical problems to emulate the operation of a magnetic disk.

According to another aspect of the present invention, a large-capacity data storage system is realized by the use of a low-storage-cost optical disk. The possibility of computerizing many data still uncomputerized widens the potential of the mainframe computer.

The technical problems to be solved by the present invention will be described below.

(1) In emulating a magnetic disk with an optical disk, it is necessary to realize a volume which is a control unit by a plurality of optical disks. Each volume of the present magnetic disk is increased in capacity to several GB or several times larger than that of the optical disk, and therefore a plurality of optical disks are required to achieve the purpose. As a result, a mechanism is required which is capable of reading and writing a plurality of optical disks efficiently. According to the present invention, the correspondence between the magnetic disk volume and the optical disks is controlled within a data storage system, and a large-capacity memory device of low storage cost is realized by the use of a library technique for transporting the optical disks to a drive unit by robotic access.

(2) The access rate of the present data storage system is remarkably low as compared with that of the magnetic disk. In emulation, a system is required to absorb the low-performance access rate. According to the present invention, access to general data is realized, for example, by apparent delay of the rotational waiting time of a magnetic disk. Also, in the VTOC (volume table of contents) access at the time of IPL (initial program loading) when access to the whole volume is expected, on the other hand, the difficulty of realizing the present data storage system by access to all the corresponding optical disks is obviated by central control of only the VTOC parts with a magnetic disk. For this purpose, a sophisticated control is executed as described in the specification, for example.

(3) Further, in the case of using a library technique for transporting an optical disk to a drive unit by robotic access, for instance, the access to the magnetic disk is utilized as a motive for the mounting process, while there is no such motive in the demounting process for returning the optical disk to an accommodation rack. In order to solve the probem stemming from this fact, the time monitoring is executed in the present data storage system.

(4) A data is recorded as a fixed-length format in an optical disk, while it is recorded as a variable-length format in a magnetic disk. As a result, a format change is necessary, and according to the present invention, is implemented by a control mechanism with a data corresponding to a track of magnetic disk stored in a data buffer.

The present invention will be explained below specifically.

In the prior art, it is necessary, as described above, to support the data processing depending on the features of a memory medium and a command of a transport system, and also for a host system to render a control specific to the storage system.

Also, a most common external storage system for the computer is provided by a magnetic disk device. A large-capacity magnetic disk device has a variable-length track format unlike the optical disk or the like storage system having a fixed-length (equal-length) format.

The result is a great burden on the host system at the time of introduction, if one is desired, of a data storage system using a low-bit-cost memory medium like the optical disk. The introduction has also been difficult to realize for the operational problems.

This problem is capable of being solved, however, if such a data storage system using a low-bit-cost memory medium, which is common for the host system, is usable in exactly the same manner as the magnetic disk generally supported by the host system.

Accordingly, it is an object of the present invention to provide a data storage system using a low-bit-cost memory medium like an optical disk capable of completely emulating a magnetic disk device, or a magnetic disk subsystem in particular as described above.

Another object of the present invention is to provide a data storage system improved in reliability and responsiveness using a low-bit-cost memory medium emulating the above-mentioned magnetic disk unit as described above.

In order to achieve the aforementioned objects, according to the present invention, there is provided a first data storage system comprising an optical disk accommodated therein and corresponding to a plurality of magnetic disk volumes which are controlled in a unit equivalent to a single magnetic disk volume, an optical disc drive for accessing the optical disk, an access controller for controlling the access of the optical disk in accordance with a command for the magnetic disk device received from a host system, and a host system interface equivalent to a magnetic disk device. The optical disk may be accommodated either fixedly in an optical disk drive unit or in a separate housing in the drive unit as required.

Further, according to the present invention, in order to achieve the above-mentioned objects, there is provided a second data storage system comprising a multi-disc storage for accommodating at least one or a plurality of optical disks equivalent to a single magnetic disk volume in a number corresponding to a plurality of magnetic disk volumes, a plurality of optical disk drive units fewer in number than the magnetic disk volumes, a transport device for transporting and causing the optical disk to access the optical disk drive unit, a transport control for controlling the transport and access of the optical disk assigned to the magnetic disk volume in accordance with a command for a magnetic disk device associated with a specific magnetic disk volume received from the host system, and a host system interface of a command equivalent to the magnetic disk device.

The aforementioned first and second data storage systems may further comprise convertor for performing for conversion between a variable-length format of the magnetic disk and a fixed-length format of the data stored in the optical disk for the data transferred with the host system for each track of the variable-length format for the magnetic disk.

It is also desirable to configure a control mechanism in such a manner that the optical disk to be accessed and the place of accommodating the optical disk are uniquely determined for the start address or the start address and the seek address of the magnetic disk volume received from the host system and which is capable of direct conversion of the particular address, the optical disk and the place of accommodation.

Further, the data storage system is desirably comprised of a memory medium for storing a data area frequently accessed such as a VTOC in place of an optical disk and accessible at higher rate than the optical disk and a memory medium access control for accessing the memory medium accessible at high rate in place of an optical disk in the case where the command received from the host system is directed to the data area mentioned above. This is because the processing efficiency could be improved by such approach.

In this case, a memory medium accessible at high rate for storing a data area frequently accessed as mentioned above may be formed in double fashion. This is because the reliability could be improved.

The data storage system according to the invention may comprise a memory medium such as an optical storage card lower in cost per bit than the magnetic disk in place of the optical disk, and a drive unit of a low cost memory medium in place of the optical disk drive unit mentioned above.

According to the first data storage system of the present invention, the access of an optical disk is controlled in accordance with a command for a magnetic disk device received from a host system, and the host system is contacted with a host system interface equivalent to the magnetic disk device, so that the host system (an operating system or the like) requires no support specific to the optical disk device, with the result that a low-cost operation is possible with an optical disk providing a low-bit-cost memory medium under a small introduction burden.

Further, according to the second data storage system of the invention, an optical disk assigned to a specific magnetic disk volume is transported and accessed to a plurality of optical disk drive units fewer in number than the magnetic disk volumes in accordance with a magnetic disk device command for the specific magnetic disk volume received from a host system, and therefore it is possible to configure a simple, low-cost data storage system with a plurality of drive units fewer in number than the magnetic disk volumes to be emulated.

As described above, according to the present invention, there is provided a data storage system using a low-bit-cost memory medium like an optical disk capable of completely emulating a magnetic disk device or a magnetic disk subsystem in particular.

Also, the reliability and response characteristic are improved of a data storage system using a low-bit-cost memory medium emulating the magnetic disk device.

DESCRIPTION OF THE PREFERRED EMBODIMENTS

A data storage system according to the present invention emulates a magnetic disk device (called a magnetic disk subsystem). Explanation will be made below about a data storage system according to the present invention taking as a typical example a case in which a magnetic disk subsystem including 256 magnetic disk volumes is emulated.

First, a configuration of the data storage system according to this embodiment will be described with reference to FIG. 1.

Figure 1:
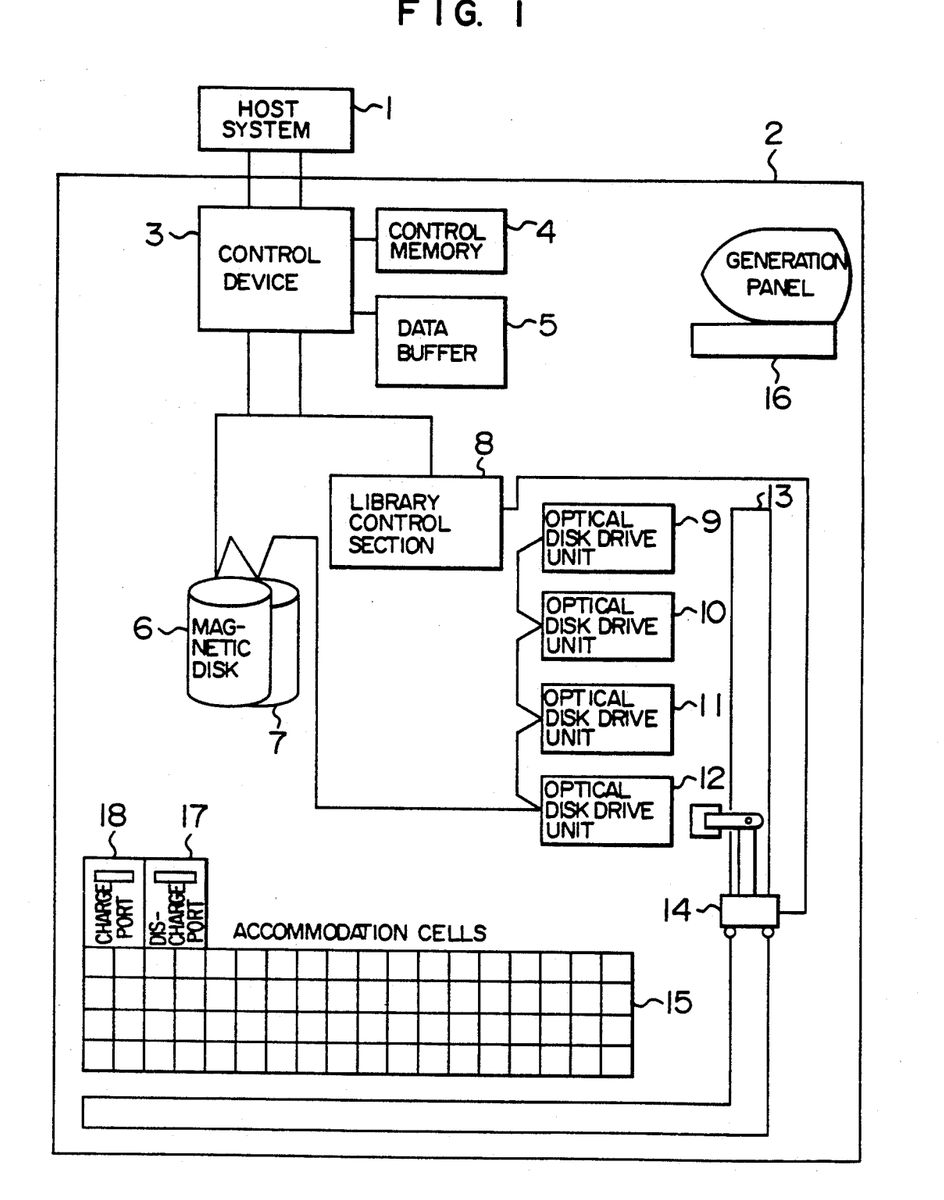
FIG. 1 is a block diagram showing a configuration of a data storage system according to an embodiment of the present invention.

In FIG. 1, reference numeral 1 designates a host system, and numeral 2 a data storage system.

In the data storage system 2, numeral 3 designates a control device for controlling the operation of the data storage system 2 as a whole, numeral 4 a control memory for controlling the correspondence between the magnetic disk volumes to be emulated and the optical disk accommodated and assigning optical disk drive units 9 to 12, numeral 5 a data buffer for reading a data into the track unit of the magnetic disk subsystem emulated from the optical disk, numerals 6, 7 magnetic disks of the magnetic disk subsystem to be emulated for centrally accommodating the tracks accessed frequently such as a VTOC described later, numeral 8 a library control section for controlling an accessor robot 14 or the like, numerals 9 to 12 optical disk drive units, numeral 13 a rail for moving the accessor robot 14, numeral 15 accommodation cells for accommodating a multiplicity of optical disks, numeral 16 an operation panel, numeral 17 a discharge port for discharging an optical disk to the magnetic disk volume unit to be emulated, and numeral 18 a charge port for charging an optical disk into a magnetic disk volume unit to be emulated.

The control device 3 is for converting the range required for access by the host system and accessing corresponding magnetic disks 6, 7 or optical disks. Specifically, the control of the magnetic disks 6, 7 and the optical disk drive units (9 to 12) loaded with the optical disk is effected by the control device 3.

Also, the control device 3 issues to the library control section 8 an instruction for transport from the accommodation cells 15 to the optical disk drive units 9 to 12 or a control instruction in the opposite direction for accommodation or the like.

In response to such an instruction, the library control section 8 effects actual control of the transport system for transporting the optical disks including the control of the accessor robot 14. Also, the library control section 8 effects as much restoration as possible of the operation of the accessor robot 14 at the time of malfunction thereof.

The optical disks are charged/discharged by the magnetic disk volume unit (required to be converted into the optical disks) by way of the charge port 18/discharge port 17 and the operation panel 2 while the data storage system is idle as in the case of addition/removal of the magnetic disk volume to be emulated. The control of the charge port 18/discharge port 17 and the operation panel 2 is effected by the control device 3.

Figure 2:
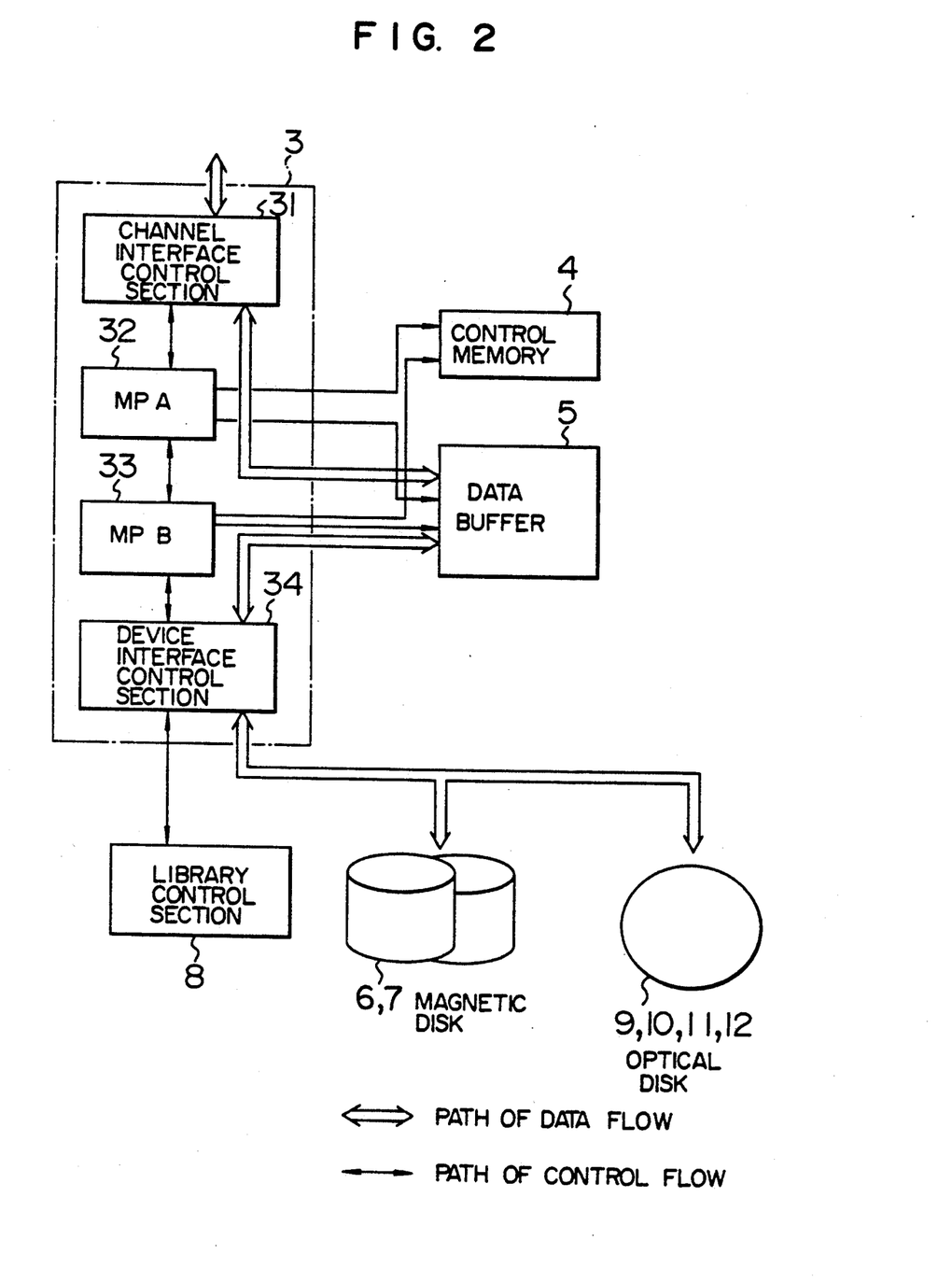
FIG. 2 is a block diagram showing an internal configuration of a control device.

FIG. 2 shows an example of the internal configuration of the control device 3.

In FIG. 2, numeral 3 designates a control device, in which numeral 31 designates a channel interface control section for connecting a plurality of channels, numeral 32 an MP_A (microprocessor 1) for the processing on channel side, numeral 33 an MP B (microprocessor 2) for the processing on device side, and numeral 34 a device interface control section.

Again in FIG. 2, numeral 4 designates a control memory, numeral 5 a data buffer, numeral 8 a library control section, numerals 6, 7 magnetic disks, and numerals 9, 10, 11, 12 optical disks in the optical disk drive unit.

MP_A 32 effects the control of the channel interface, the control of data transfer between the host system and a cache, processes channel commands, assigns the optical disk drive units 9 to 12, and effects the exclusive control of the optical disks. The channel interface provides an interface matching the magnetic disk subsystem.

The assignment of an optical disk drive unit is the function of determining which of the optical disk drive units 9–12 is to be used while reading the control memory 4.

The exclusive control of an optical disk, on the other hand, is the function of eliminating the access from other systems to all the optical disks accessed only by a particular access demand by means of the control memory 4.

MP_B 33, on the other hand, takes charge of such functions as the control of the drive interface, data transfer between the data buffer and the drive unit, advance reading from the optical disk drive units (drive), summary writing and the library control.

Now, explanation will be made about the relationship between the magnetic disk subsystem to be emulated and a corresponding optical disk with reference to FIG. 3.

Reference is had to a data storage system often used according to the present embodiment. In this embodiment, the host system is assumed to support a magnetic disk device interface using a byte of the start address of the magnetic disk volume, and a single data storage system according to this embodiment emulates all the start addresses, that is, 256 magnetic disk volumes.

In the data storage system according to this embodiment, an optical disk is set in correspondence with each magnetic disk volume to be emulated.

The data storage system according to this embodiment further comprises a control mechanism capable of uniquely designating a target optical disk by a start address and a seek address issued by the host system.

Further, the control memory 4 includes therein a volume exclusive control table for preventing the competitive access to the optical disks. In other words, a particular optical disk is prevented from being used by other disks by locking means.

This volume exclusive control is effected in the manner mentioned below.

Figure 3:
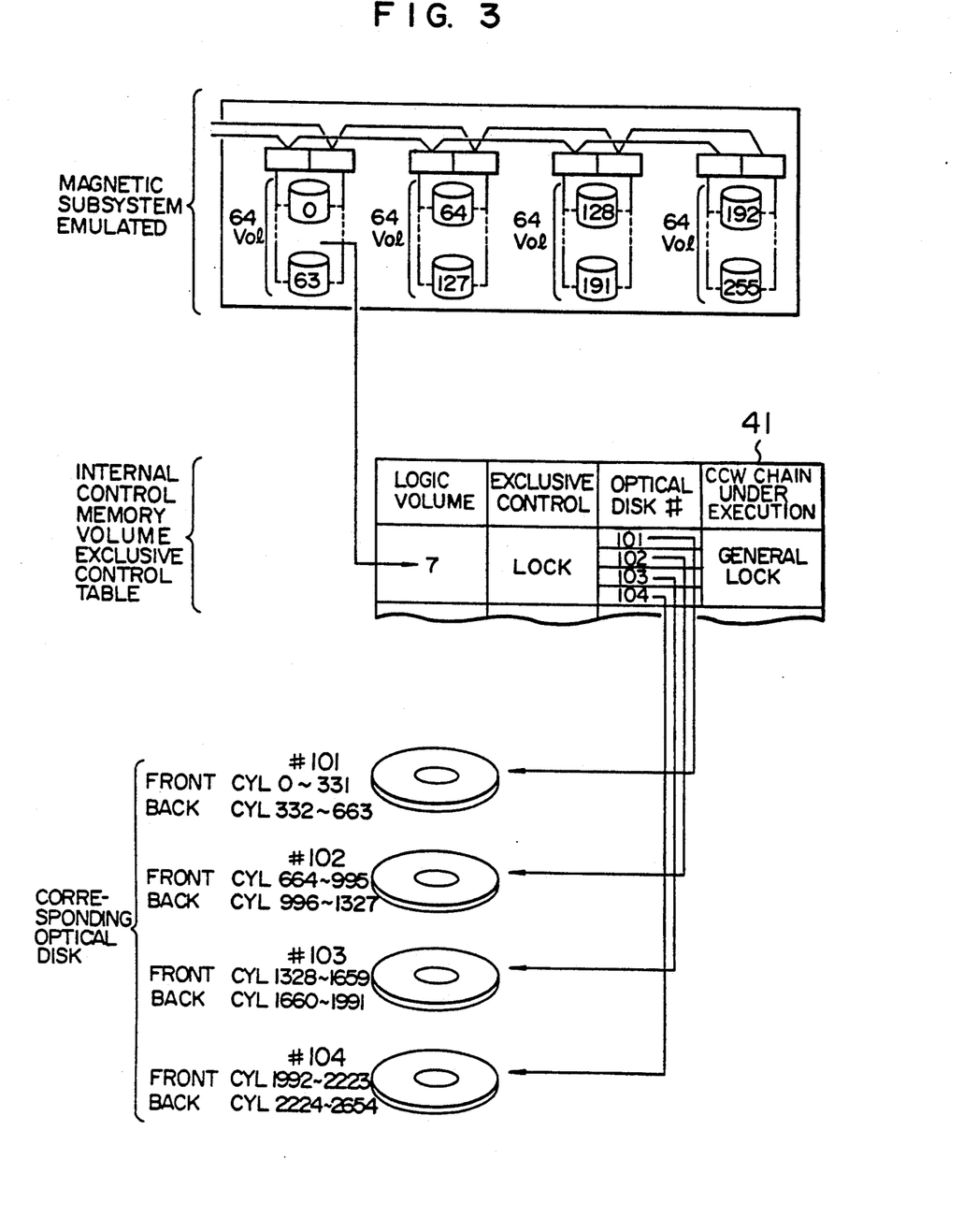
FIG. 3 is a diagram for explaining the relationship between a magnetic disk subsystem and the emulation of a large-capacity data storage system.

In FIG. 3, for example, assume that a magnetic disk volume of address 7 in the magnetic disk subsystem is accessed as viewed from the host system. In the data storage system according to this embodiment, the MP_A 32 in the control device 3 sets the lock to the volume number 7 (logic VOL) in the control memory 4, while at the same time setting the lock to the optical disks 101 to 104 corresponding to the magnetic disk volumes thereby to prevent access from other systems.

In the shown case, the cylinders 0 to 663 of the magnetic disk volume are assigned to the optical disk 101, the cylinders 664 to 1327 to the optical disk 102, the cylinders 1328 to 1991 to the optical disk 103, and the cylinders 1992 to 2654 to the optical disk 104. These optical disks make up a logic volume for the magnetic disk of address 7.

MP_A 32, upon receipt of a seek address, identifies a corresponding optical disk number from the control mechanism, and notifies the MP_B 33, which in turn gives a transport instruction to the library control section 8. The seek address specifically includes a cylinder number and a head number, for example, although it may include a record number in some cases.

According to the present embodiment, instead of eliminating the access from other systems to all the optical disks corresponding to the start address (of the magnetic disk volume to be emulated) (four optical disks in the present case) as an object of locking, a specific optical disk may be locked by a seek address.

The operation of the present data storage system will be briefly described below.

Upon receipt of a command for magnetic disks from the host system, the MP_A 32 analyzes the command and controls the magnetic disks 6, 7 or the optical disks 9 to 12 through the MP_B 33 and the drive interface control section 34 as required.

In the process, according to the data storage system under consideration, in the case where the access of the host system is to the magnetic disk volume of VTOC label or the like (normally SYL #0), the fact that the VTOC label is centrally controlled at the magnetic disks 6, 7 causes the access to a designated area of the magnetic disks 6, 7.

Generally, in a large-sized system or a large-sized magnetic disk subsystem, the VTOC of each magnetic disk volume is centrally accessed at the time of IPL (Initial Program Loading). According to the present embodiment in which the magnetic disks 6, 7 are accessed for a frequently-accessed area, the performance is expected to be improved remarkably as compared with the case in which an optical disk is selected from the accommodation cells 15 shown in FIG. 1 and transported by the accessor robot 14 to be charged into any of the optical disk drive units 9 to 12 in search of a target sector position.

Also, the fact that the system is capable of being subjected to IPL without transportation permits emulation of a large-capacity magnetic disk subsystem.

According to the present embodiment, an electronic memory or the like may be used in place of the magnetic disks 6, 7 as a device for accommodating a frequently-accessed area.

Further, in view of the serious effect of a fault, if any, of the VTOC or the like component parts, according to the present embodiment, the magnetic disk is formed in double fashion as a high-reliability design. This doubling process is also effected by the MP_B 33.

In the case where the access of the host system is to the data area other than the magnetic disk volume of the VTOC label or the like (normally SYL #0), on the other hand, the control device 3 functions in such a manner as to make access to a corresponding optical disk.

In the process, the MP_A 32 accesses the control memory and gives an instruction on the mounting of an optical disk accommodating the particular data area to the MP_B 33 while designating the place of accommodation (any of the optical disk drive units 9 to 12).

The MP_B 33, in compliance with the instruction, gives an instruction to the library control section 8 and executes the processing of mounting the particular optical disk.

In respect of the optical disks 9 to 12 for which the mounting process is complete, the MP_B 33 receives from the MP_A 32 the position of the corresponding sector 9 associated with the emulated magnetic disk accessed.

As the next step, the data representing one track of the magnetic disk volume is fetched into the data buffer 5 from the target sector of the optical disk 10 through the drive interface control section 34, after which the access demand block is operated in the data buffer to change the format in the manner mentioned below.

The data thus changed in format is then transferred to the host system through the channel interface control section under the control of the MP_A 32.

In the case where a write command is received from the host system, in contrast, the data representing a track of the magnetic disk volume transferred from the host system is accommodated in the data buffer 5, and after being changed in format, is written into the target sector of the optical disk 10.

The transfer process between the optical disk and the host system will be explained in detail below.

First, the process to the mounting of the optical disk will be explained with reference to FIG. 4A.

Figure 4A:
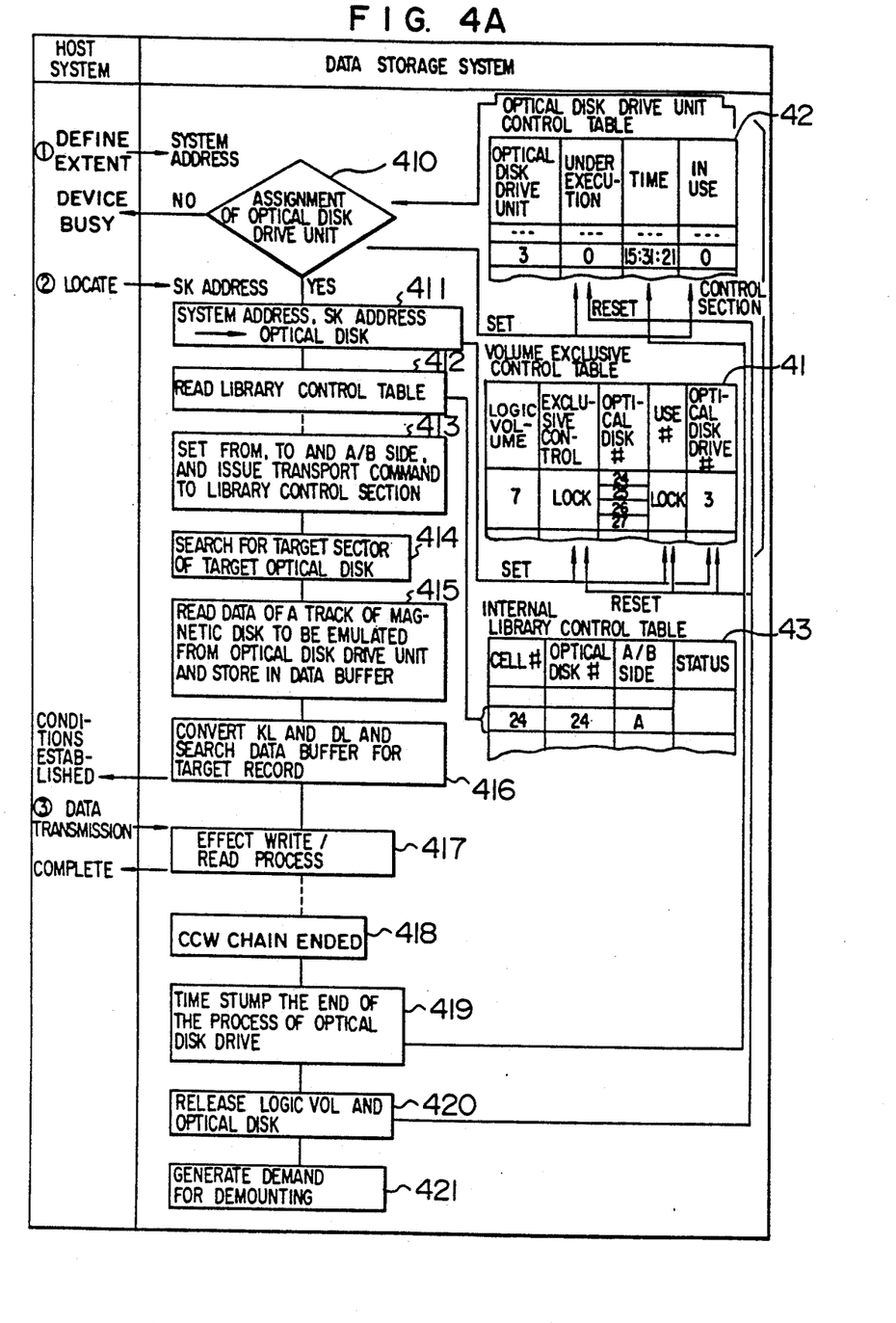
FIG. 4A is a flowchart showing the process of mounting.

In FIG. 4A, the left column represents the command sequence with the host system, and the right column the process of the data storage system.

A common command system of the magnetic disk subsystem is such that the magnetic disk volume address to be accessed and the range of access are set in compliance with a "DEFINE EXTENT" command, and the cylinder number, head number, sector number, operation type and the like are notified to the disk control device in compliance with a "LOCATE" command. In response to these operations, the disk drive units of the magnetic disk subsystem start a seek operation and the positioning at a target sector. Upon the positioning at the target sector, the establishment of the conditions is notified to the host system, thereby starting data transfer with the host system.

Explanation will be made according to the present embodiment on the assumption that a magnetic disk subsystem having a command sequence as described above is emulated.

Specifically, in a data storage system, each command received is developed into a plurality of instructions for such systems as the transport, magnetic disk and optical disk drive unit.

The optical disk drive unit control table designated by numeral 42 in FIG. 4A is disposed inside the control memory 4 (See FIG. 1) for controlling such information as "CCW UNDER EXECUTION" indicating whether or not the CCW is being executed by other systems, "TIME" indicating the time when the particular optical disk drive unit was accessed for the last time, "IN USE" indicating the condition in which the optical disk in use is accommodated in the particular optical disk drive unit and the like for each optical disk drive unit.

"CCW UNDER EXECUTION" is indicative of the fact that a series of processes against a command chained from the host system is being executed.

With reference to this optical disk drive unit control table, the control device 3 that has received the "DEFINE EXTENT" command issued from the host system stores the device address (the magnetic disk volume number to be emulated) and assigns an optical disk drive unit (step 410).

In other words, the MP_A 32 (See FIG. 2) reads the item of the table involved and the "IN USE" information to seek "0" (vacancy).

In the case of vacancy or in the case where there is available a usable disk drive unit (3 in the case under consideration), the "CCW UNDER EXECUTION" corresponding to the particular disk drive unit is set to "IN USE" thereby to eliminate the use by other systems.

In the absence of vacancy, on the other hand, the bit "0" of "CCW UNDER EXECUTION" is sought and if it is available, the demounting process is effected. In the case where there is not available any such bit, a "DEVICE BUSY" is reported to the host system.

Upon completion of the demounting process, the "CCW UNDER EXECUTION" corresponding to the particular disk drive unit table is set to "IN USE" thereby to eliminate the use from other systems.

When the process for the "DEFINE EXTENT" command is completed, the "LOCATE" command is chained.

In view of the fact that a seek address (of the magnetic disk to be emulated) is received in response to the "LOCATE" command, the optical disk number and the sector position to be accessed are identified by the MP_A 32 (step 412).

In the process, as is often the case with a large-sized magnetic disk subsystem, in the case where the "LOCATE" command has a detailed information like the block length or the number of blocks operated by the CCW, it is possible by using such information to determine the range of pull into the data buffer from the optical disk as described later.

Also, the MP_A 32, together with the identification of an optical disk, locks for exclusive control the logic VOL corresponding to the magnetic disk volume to be emulated of the volume exclusive control table 41 in the control memory 4 and four optical disks making up the logic VOL as described above. Further, the number of the optical disk drive unit for mounting an optical disk is set in the "optical disk drive unit #".

On the other hand, the information on the accommodation cells including the accommodation cells, the present position and the side of an optical disk faced are controlled by the library control section 8 (See FIG. 1) through the library control table (43 in FIG. 4A).

The MP_B 33 for which an optical disk and the place of accommodation (optical disk drive units 9 to 12) are designated by the MP_A 32 issues a library control table read instruction to the library control section (step 412) to determine the place and conditions of accommodation of the particular optical disk. The library control table is placed in the library control section in order to conduct the retrial or other procedures in the library control section in the case of a malfunction of transportation.

Further, the MP_B 33 sets the place of accommodation of the particular optical disk, the transport address received from the MP_A and the like and issues a transport designation command to the library control section (step 413). Information on the designation for selection of the side A/B is also added at this time and realized as a part of the transport and mounting processes.

The library control section transports the particular optical disk from the cell number 24 in the shown case, for example, and mounts it at the optical disk drive unit number 3.

Upon completion of the mounting process, the MP_B 33 receives the sector position of the optical disk identified by the MP_A 32 and issues a positioning instruction to the particular optical disk drive unit (step 414), followed by reading the data representing one track of the magnetic disk volume to be emulated and storing them in the data buffer 5 (step 415).

Unlike according to this embodiment in which a track of data is used as a read unit, a plurality of tracks may be employed as a load unit.

As the next step, the MP_B 33 searches the load data in the data buffer and identifies the sector on the basis of the sector number received from the host system (step 416).

Upon completion of the search process in the data buffer, the MP_B 33 notifies the MP_A 32 so that the MP_A notifies the host system of the establishment of conditions by interruption.

When viewed from the host system, the time from the issue of the "LOCATE" command to the receipt of the interruption appears to be the one of very slow seek and search operation of the magnetic disk subsystem. It is necessary, therefore, for the host system to set a sufficiently long I/O time monitor time.

The host system that has received the establishment of conditions immediately effects the write/read process (step 417).

In this write process, the risk of the data in the data buffer being unreflected in the optical disk would be reduced if the MP_B 33 gives a write instruction to the optical disk drive unit from the data buffer 5 and reports the notification of the complete write process to the host system after completion of the write process.

Once the CCW execution is complete (step 418), the MP_A 32 sets the time of ending the use of the optical disk drive unit to the "Time" of the optical disk drive unit control table (step 419), resets the lock of the "logic VOL" and the "optical disk" of the volume exclusive control table 41 and further resets the "CCW UNDER EXECUTION" of the "optical disk drive unit" of the optical disk drive unit control table (step 420).

Figure 4B:
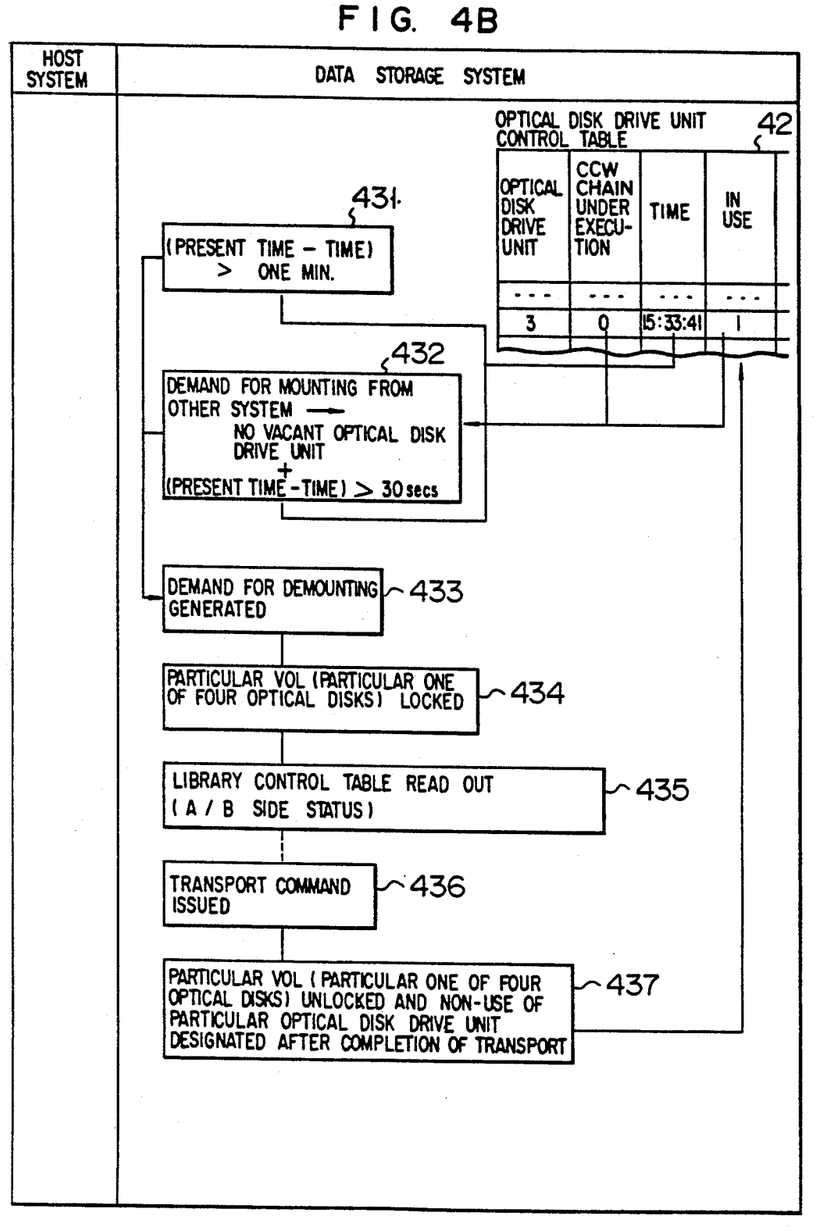
FIG. 4B is a flowchart showing the processes of demounting.

Now, the process to the demounting of the optical disk after completion of the CCW execution is shown in FIG. 4B.

The data storage system according to this embodiment has no motive of demounting since the magnetic disk subsystem is emulated.

As a result, an access demand may arrive for an optical disk once mounted. The mounted state, therefore, is retained for a predetermined length of time (one minute in the case under consideration), and the demounting process is effected after the lapse of a predetermined length of time or after the lapse of 30 seconds from the preceding access in the case where a mount demand is received from another system in the absence of a vacant optical disk drive unit.

According to the present embodiment, the mounted condition is grasped from the state in FIG. 1 in which the "CCW UNDER EXECUTION" is "off (0)" with the "IN USE" bit upright in the optical disk drive unit control table in the control memory 4.

The "IN USE" bit is reset by the MP_A 32 at the time of demounting the optical disk.

Now, assume that there exists an optical disk drive unit which has completed the access more than one minute before the present time point.

In the absence of any access demand, the MP_A 32 searches the optical disk drive unit control table and determines the difference between the present time and "Time". In the case of the lapse of more than one minute (step 431), a demand for demounting the optical disk drive unit for which the time has elapsed is generated (step 433).

The "Time" is set to the end of the CCW completion as described above, and therefore the difference between the present time and the "Time" is regarded as the time interval during which no access demand is generated in the optical disk.

In the case where an access demand is generated with the optical disks mounted in all the optical disk drive units (step 432), the MP_A 32 searches the optical disk drive unit control table for an optical disk drive unit which is not accessed by any host system with the "CCW UNDER EXECUTION" bit "off". In the absence of such an optical disk drive unit, "DEVICE BUSY" is reported. In the presence of such an optical disk drive unit, on the other hand, the difference between the present time and "Time" is determined for the particular optical disk drive unit, and a demand for demounting an optical disk drive unit that has passed more than 30 seconds is generated (step 437).

Upon generation of a demand for demounting, the MP_A 32 searches the volume exclusive control table 41 for an optical disk mounted in the particular optical disk drive unit.

As described above, the number of the mounted optical disk drive unit is set in the "optical disk drive (unit) #" of the volume exclusive control table 41 in the mounting process, and therefore it is possible to identify the optical disk from such an "optical disk drive (unit) #" at the time of executing the demounting process (step 434).

In the shown case, the optical disk drive unit is assigned for each magnetic disk volume to be emulated, thereby indicating that one of the four optical disks is mounted in the optical disk drive unit number 3.

The MP_A 32 eliminates the demand for use from other systems by locking the optical disk (for each magnetic disk volume to be emulated in the present case) until the end of the demounting process, and notifies the locked optical disk number to the MP_B 33.

In response to this notification, the MP_B 33 searches the internal library control section control table in the library control section 8 and reading the status, acquires the information as to which one of the four optical disks is mounted by searching for the "status" indicating the location of the optical disk (the optical disk drive unit number with the optical disk mounted while holding the cell accessor robot). At the same time, the return position of the optical disk mounted and the side (A or B) on which the particular optical disk is mounted are determined (step 435). Then, such parameters as the return cell position and the side A/B return instruction are set, while issuing a transport command to the library control section (step 436).

In response to this command, the library control section 8 executes the demounting process by the use of the accessor robot 14 (See FIG. 1).

Upon completion of the execution of this process, the MP_A 32 unlocks the demounted optical disk (for each magnetic disk volume to be emulated in the case under consideration) in the volume exclusive control table, and sets the "IN USE" of the optical disk drive unit control table to "0" while at the same time releasing the resources such as the optical disks and the optical disk drive units.

An alternative method of demounting is to execute the demounting process as a preliminary process except under CCW execution in response to a demand for mounting from another system without monitoring the time.

Now, explanation will be made about the conversion process between the variable-length format which provides a storage format for a magnetic disk subsystem and the fixed-length (equal-length) format providing a storage format for the optical disk.

Generally, a reloadable optical disk is used for the fixed-length storage format with a data block comprised of a fixed-length equal record.

In a large-sized system, on the other hand, the magnetic disk uses a variable-length storage format comprised of a count section (C section), a key section (K section) and a data section (D section).

Figure 5:
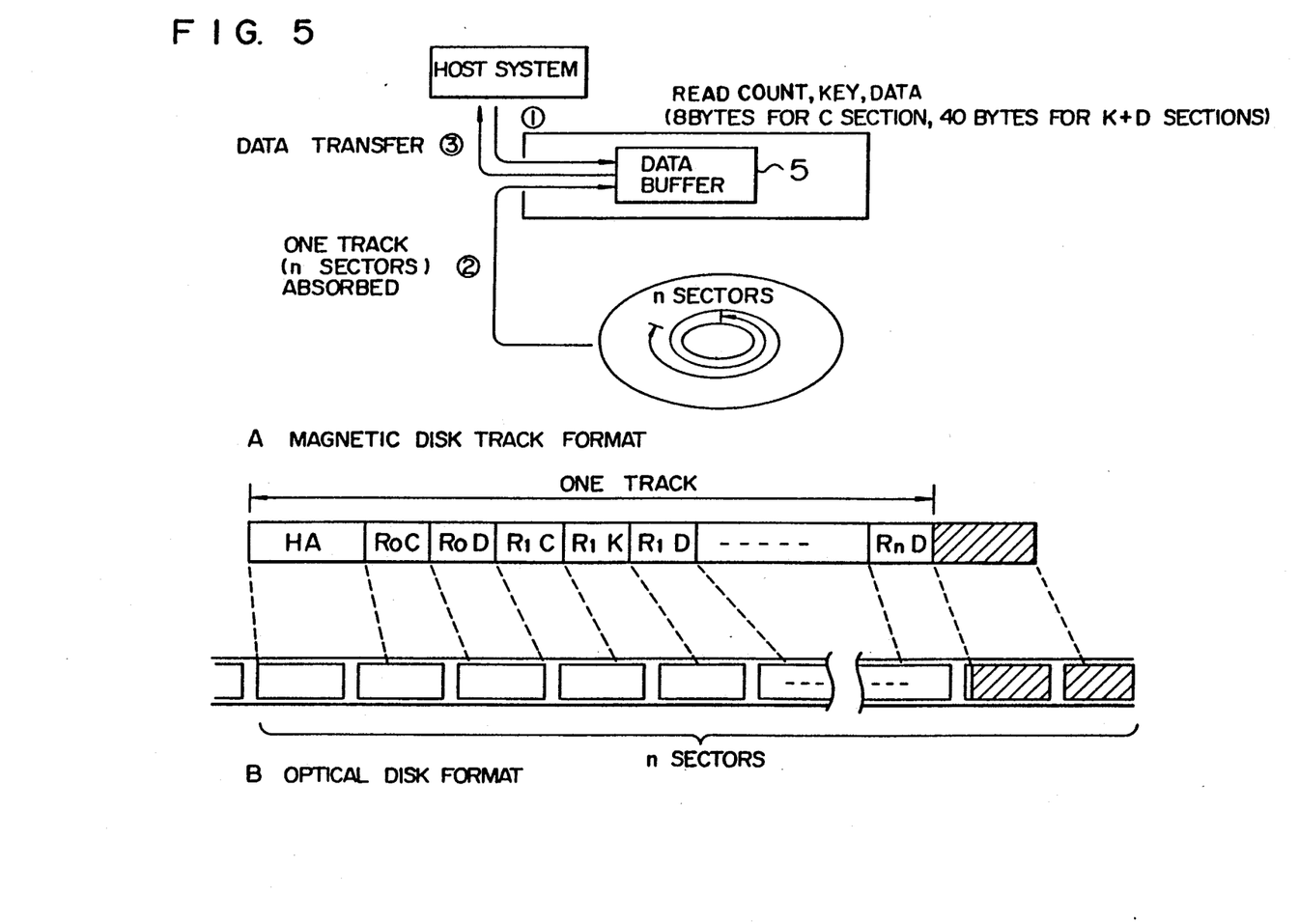
FIG. 5 is a diagram for explaining the conversion of storage format between optical disk and magnetic disk.

The conversion between the two formats is effected through the data buffer 5 (See FIG. 5).

In this embodiment, data is read by the data buffer from an optical disk for each track of the magnetic disk volume to be emulated and is written into the optical disk from the data buffer.

This operation is performed in view of the fact that even a variable-length track format is limited in the quantity of the data (record size) that can be handled in each track, and conversion is possible into a form consisting of a number n of sectors making up the fixed-length format of the optical disk for each track.

As shown in FIG. 5, therefore, the data of n sectors is stored in the data buffer as a unit.

In storing in the optical disk, each track received from the host system thus takes such a form that the data is sequentially written from the head of the n sectors assigned to the particular track.

In the case where a "READ COUNT KEY AND DATA" command is received from the host system for reading a total of 48 bytes including eight bytes for the count section and 40 bytes for the key and data sections, for example, the MP 24 issues an instruction to the optical disk drive unit to read a number n of sectors from the sector representing the head of the track designated by the host system and loads them in the data buffer.

After loading a track of data in the data buffer, the target record is determined by conversion from the key and data lengths in the count section of each record starting with the fixed-length area such as HA and RO to continue the scanning.

After reaching the target record position, the data is then read and written with the host system.

As an alternative method of conversion, special codes are buried between the count, key and data sections as a storage format, gaps between which are used to reach the position of the target record, or the key and data lengths making up each record are held separately for each track so that conversion is made from the control data thereof to reach the position of the target record.

Also, in the case where the key and data lengths making up each record are held for each track, these control data may be stored in the magnetic disks 6, 7.

As described above, the data storage system according to the present embodiment may be configured using an optical disk system by means of a magnetic disk subsystem interface, and therefore no support depending on the features of the memory medium is required at the time of introduction, thus making possible a low-cost operation with a low-bit-cost medium.

Further, in view of the fact that a subsystem is capable of being built with drive units in the number fewer than the magnetic disk volumes to be emulated, a simple, high-reliability subsystem is realized.

Furthermore, the possibility of central control of the important areas such as VTOC at the magnetic, the electronic memory or the like permits immediate response in the case where the VTOC reference is required of all the disk volumes as at the time of IPL.

Another advantage of this embodiment is that since the optical disk is assigned for each magnetic disk volume and the ratio of 1 to 1 is secured between the storage area recognized by the host system and the actual storage area on the optical disk, the magnetic disk volume units may be logically added, thereby making possible a versatile subsystem configuration.

In addition, the fact that a variable-length format is capable of being converted into a fixed-length format makes it possible to support the commands of a general variable-length form in a large-sized magnetic disk subsystem.

What is more, the magnetic disk, the electronic memory and the like are formed in double fashion, and therefore the reliability of the important areas in the same magnetic disk volume is improved.

The present embodiment has been explained with reference to a case in which a magnetic disk subsystem is emulated and the interface thereof is required to be satisfied. A data storage system according to the present invention, however, may be realized for emulating such a system as using a magnetic tape or the like with equal effect.

As a further feature of the invention, unlike in the present embodiment using an optical disk as a memory medium of the data storage system, another low-bit-cost memory medium may alternatively be used.

It will thus be understood from the foregoing description that according to the present invention a command is issued from a host system in the form equivalent to a magnetic disk, whereby the whole system including the optical disk drive unit 9 and the library control section 8 for transporting the optical disk, as well as the magnetic disk, is capable of being effectively controlled.

What is claimed is:

1. A data storage and emulation system for use with an operatively associated host computer using a command in a magnetic disk command format to access data stored according to a magnetic disk data format, the data storage and emulation system comprising:
   at least one optical disk having a storage capacity of a first volume of a magnetic disk;
   optical disk drive means, receiving said at least one optical disk, for reading and writing data to and from said at least one optical disk in an optical disk data format;
   control means, connected to said optical disk drive means and including a data processing means having a first portion responsive to a first command signal received from the host computer in said magnetic disk command format requesting an access to first data stored in said optical drive means according to said optical disk data format, for controlling the reading and writing of the first data to and from the at least one optical disk, the control means including a data processor external of said host computer and having i) a first processing portion interpreting said first command signal and ii) a second processing portion executing said interpreted first command signal to selectively load a first optical disk into said optical disk drive means; and,
   means connecting the optical disk drive means and the control means to said host computer for emulating a magnetic disk device by i) receiving data in said magnetic disk data format from and ii) transmitting data in said magnetic disk data format to the host computer through an interface including said data processor equating the at least one optical disk to a magnetic disk device compatible with the host computer.

2. A data storage and emulation system according to claim 1, wherein said control means includes means for effecting a conversion between a variable-length magnetic disk data format of the first data transferred to and from the host computer and a fixed-length optical disk data format thereof for use in the at least one optical disk, said conversion being effected for each track in the variable-length magnetic disk data format.

3. A data storage and emulation system according to claim 1, further comprising means for uniquely determining a first optical disk to be accessed and a place of accommodation of the first optical disk according to a selected one of a start address and the start address plus a seek address of a volume of the first command signal in said magnetic disk command format received from the host system.

4. A data storage and emulation system according to claim 1, further comprising:
   a memory medium means, accessible at a higher rate than an access rate of said at least one optical disk, for storing frequently-accessed data in a first data area; and,
   means for selectively accessing the memory medium means in place of the optical disk when a second command signal in said magnetic disk command format received from the host computer is associated with said first data area.

5. A data storage and emulation system according to claim 4, wherein the memory medium means is formed in a double fashion.

6. A data storage and emulation system according to claim 1, further comprising: a memory medium, in place of the at least one optical disk, lower in cost per bit than the magnetic disk device; and, a drive unit in place of the optical disk drive means for the memory medium.

7. A multi-disk optical data storage and emulation system for use with an operatively associated host computer system to emulate a magnetic disk device, the data storage and emulation system comprising:
   a plurality of optical disks accommodated in the system, each of the plurality of optical disks being sized according to one volume of the magnetic disk device, said plurality of optical disks representing a plurality of volumes of magnetic disks;
   a plurality of optical disk drive units fewer in number than said plurality of volumes of magnetic disks, each of the plurality of optical disk drive units receiving a one of the plurality of optical disks and communicating data therewith;
   transport means, operatively connecting said plurality of optical disks with said plurality of optical disk drive units, for selectively transporting first ones of the plurality of optical disks to first ones of the plurality of optical disk drive units to enable access to the first ones of optical disks by the first ones of optical disk drive units;
   control means connected to said transport means for controlling the transport and access of a first optical disk assigned to a specific first magnetic disk volume in accordance with an access command for access to the magnetic disk device received from the operatively associated host computer system in relation to the specific first magnetic disk volume, the control means including a data processor external of said host computer and having i) a first processing portion interpreting said access command and ii) a second processing portion executing said interpreted access command to selectively load said first optical disk into a one of said plurality of optical disk drive units; and, a host computer system interface means, interfacing the operatively associated host computer system with the multi-disk optical data storage and emulation system to emulate the magnetic disk device, for emulating accesses to the plurality of optical disks as accesses to the magnetic disk device.

8. A data storage and emulation system according to claim 7, wherein said control means includes means for effecting a conversion between a variable-length magnetic disk data format for use in the magnetic disk device and a fixed-length optical disk data format for use in the plurality of optical disks, said variable-length magnetic disk data format being used for data which is transmitted to and received from said operatively associated host computer system, said conversion being effected for each track in the variable-length magnetic disk data format for use in the magnetic disk device.

9. A data storage and emulation system according to claim 7, further comprising means for uniquely determining a first optical disk to be accessed and a place of accommodation of the first optical disk among said plurality of optical disk drive units according to a selected one of a start address and the start address plus a seek address of a volume of the magnetic disk device received from the host system.

10. A data storage and emulation system according to claim 7, further comprising:
a memory medium means, accessible at a higher rate than an access rate of the plurality of optical disks, for storing, in place of ones of the plurality of optical disks, frequently accessed data in a first data area; and,
means for selectively accessing the memory medium means when a command received from the operatively associated host computer system is associated with said first data area.

11. A data storage and emulation system according to claim 10, wherein the memory medium means is formed in double fashion.

12. A data storage and emulation system according to claim 7, further comprising: a memory medium, in place of ones of the plurality of optical disks, lower in cost per bit than the magnetic disk device; and, a drive unit for the memory medium in place of ones of the plurality of optical disk drive units.

13. A data storage system comprising:
a host system for receiving a command in a magnetic disk format, transmitting a command in the magnetic disk format, receiving data in the magnetic disk format, and transmitting data in the magnetic disk format;
a magnetic disk storing data in the magnetic disk format;
magnetic disk control means, connected to the magnetic disk, for accessing the magnetic disk and transferring the data stored in the magnetic disk to the host system in accordance with a command issued from the host system;
a set of optical disks, each having a memory capacity equivalent to magnetic disk volume;
conversion means, operatively connecting the data storage system to the host system, for converting said command in the magnetic disk format and data in the magnetic disk format into an optical disk format for ready use by the set of optical disks;
optical disk control means for receiving from the host system a first command in the magnetic disk format and converting the first command into a first command in the optical disk format for ready use by the set of optical disks through the conversion means, thereby accessing the optical disks, converting the data stored in the optical disks into that of the magnetic disk format for use by the magnetic disk by the conversion means, and transferring the data to the host system, the optical disk control means including a data processor external of said host system and having i) a first processing portion interpreting said first command from the host system and ii) a second processing portion executing said interpreted first command to selectively generate a first optical disk load command signal; and,
transport control means operatively connecting the set of optical disks to the optical disk control means, for transporting a one of the set of optical disks to a position accessible by the optical disk control means on the basis of said first optical disk load command signal from said second processing portion of the data processor.

14. A data storage system according to claim 13, wherein said conversion means includes means for effecting a conversion between a variable-length magnetic disk format for use by the magnetic disk and a fixed-length optical disk format for use by an optical disk, said conversion being effected for each track in the variable-length magnetic disk format for use by the magnetic disk.

15. A data storage system comprising:
a host system for transmitting and receiving i) a command developed for use in a magnetic disk and ii) data of a variable-length format;
a first memory medium storing data of a capacity corresponding to at least one unit of a magnetic disk volume in a fixed-length format;
a driving unit, connected to the first memory medium, for reading and writing data from and to said first memory medium;
memory means for storing first information indicating a corresponding relationship between the magnetic disk volume and said first memory medium, and storing second information indicating a use condition of said driving unit;
buffer means for storing data of a predetermined track unit determined for the magnetic disk; and
a control device, connecting the memory means, the buffer means and the driving unit to the host system, for interpreting the command for use for the magnetic disk received from said host system to assign said driving unit by making reference to the said information stored in said memory means, identifying a memory medium of said first memory medium and an access position of the memory medium corresponding to an access range requested by said host system by making reference to the first information stored in said memory means, controlling the assigned driving unit to execute a processing designated by the command for use for the magnetic disk with respect to the access position of the identified memory medium, and performing a format conversion with respect to data stored in said buffer means, wherein said control device includes i) means for transmitting and receiving data in the variable-length format to and from said host system, and transmitting and receiving data in the fixed-length format to and from said assigned driving unit and ii) a data processor external of said host system having a first processing portion interpreting said command received from said host system and a second processing portion for selectively accessing said identified memory medium of the first memory medium according to said command interpreted by the first processing portion.

16. A data storage system according to claim 15, further comprising:
   a second memory medium different from said first memory medium and connected to said control device, for storing particular data contained in said variable-length format received from said host system, and
   means in said control device for controlling access to said second memory medium when a command received from said host system relates to said particular data.

17. A data storage system according to claim 16, wherein said control device includes means, when controlling to access to said second memory medium, for controlling writes of said particular data to two memory mediums of said second memory medium and doubling the data to be recorded on said second memory medium.

18. A data storage system according to claim 15, further comprising;
   accommodating means for accommodating therein said first memory medium;
   transporting means, operatively connected to the accommodating means, for removing a designated storage medium from said accommodating means and transporting the removed storage medium to the drawing unit assigned by said control device to mount the memory medium on said driving unit; and,
   transportation control means connected to the transporting means for storing third information indicating an accommodation condition of said first memory medium in said accommodating means and controlling said transporting means,
   wherein said control device includes means for reading an accommodation condition of said identified memory medium from said third information stored in said transportation control means, designating an accommodation position of said identified memory medium to said transportation control means, and instructing the transportation control means to transport and mount the identified memory medium to and on the assigned driving unit.

19. A data storage system according to claim 18, wherein said control device includes means for checking a use condition of said driving unit by making reference to said second information stored in said memory means, and when an access request has not been issued from said host system to the one of said first memory medium for a predetermined period of time, said control device instructs said transportation control means to demount the one of said first memory medium from said driving unit and to accommodate at a position designated by said accommodating means.

* * * * *

UNITED STATES PATENT AND TRADEMARK OFFICE
CERTIFICATE OF CORRECTION

PATENT NO. : 5,313,617
DATED : May 17, 1994
INVENTOR(S) : Toshio Nakano, et al.

It is certified that error appears in the above-indentified patent and that said Letters Patent is hereby corrected as shown below:

Claim 15, column 16, line 56, delete the first occurrence of "said" and substitute therefor --second--.

Signed and Sealed this

Ninth Day of August, 1994

Attest:

BRUCE LEHMAN

*Attesting Officer*     *Commissioner of Patents and Trademarks*